US005509555A

United States Patent [19]
Chiang et al.

[11] Patent Number: 5,509,555
[45] Date of Patent: Apr. 23, 1996

[54] METHOD FOR PRODUCING AN ARTICLE BY PRESSURELESS REACTIVE INFILTRATION

[75] Inventors: Yet-Ming Chiang, Framingham; ong-Ren Lee, Cambridge; Leszek Hozer, Boston, all of Mass.

[73] Assignee: Massachusetts Institute of Technology, Cambridge, Mass.

[21] Appl. No.: 254,369

[22] Filed: Jun. 3, 1994

[51] Int. Cl.$^6$ ..................................................... B31D 3/00
[52] U.S. Cl. .............................. 216/56; 216/96; 216/101; 428/539.5; 428/545
[58] Field of Search ..................................... 156/639, 656, 156/657, 664; 428/539.5, 545; 501/87, 91; 419/12, 13, 17, 19, 23, 57; 75/236, 238, 244; 427/336, 337; 216/56, 96, 100, 101

[56] References Cited

U.S. PATENT DOCUMENTS

| | | | |
|---|---|---|---|
| 3,235,346 | 2/1966 | Hucke | 29/190 |
| 4,429,009 | 1/1984 | Pastor et al. | 428/410 |
| 4,482,924 | 6/1988 | Farris et al. | 428/221 |
| 4,764,560 | 8/1988 | Mitchell | 524/506 |
| 4,777,014 | 10/1988 | Newkirk et al. | 419/12 |
| 4,859,503 | 8/1989 | Bouix et al. | 427/249 |
| 4,882,306 | 11/1989 | Kennedy et al. | 501/87 |
| 4,885,130 | 12/1989 | Claar et al. | 419/12 |
| 4,891,338 | 1/1990 | Gesing et al. | 501/87 |
| 4,891,407 | 1/1990 | Mitchell | 525/104 |
| 4,904,446 | 2/1990 | White et al. | 419/13 |
| 4,921,725 | 5/1990 | Bouix et al. | 427/45.1 |
| 5,004,034 | 4/1991 | Park et al. | 164/97 |
| 5,006,622 | 11/1991 | Claar et al. | 501/87 |
| 5,011,063 | 4/1991 | Claar | 228/122 |

(List continued on next page.)

FOREIGN PATENT DOCUMENTS

| | | | |
|---|---|---|---|
| 0299905 | 1/1989 | European Pat. Off. | C04B 35/65 |
| 2104103 | 3/1983 | United Kingdom | B22F 3/00 |

OTHER PUBLICATIONS

Chiang et al., "Reaction formed silicon carbide", Materials Science and Engineering, A144 (1991) 63–74.
Balaba et al., "The effect of siloxane spin-on-glass and reaction bonded silicon oxycarbide coatings with a self-propagating interfacial reaction treatment (ASPIRE) in the synthesis of carbon/graphite fiber-reinforced aluminum metal matrix composites", J.Mater. Res., 8 (1993) 3192–3201.
Chiang et al., "Reaction-Based Processing Methods for Ceramic-Matrix Composites", Ceramic Bulletin, 68 (1989) 420–428.
Messner et al., "Liquid–Phase Reaction–Bonding of Silicon Carbide Using Alloyed Silicon–Molybdenum Melts", J. Am. Ceram. Soc., 73 (1990) 1193–1200.
Clarke, "Interpenetrating Phase Composites", J. Am. Ceram. Soc., 75 (1992) 739–758.
Lange et al., "Method for Processing Metal–Reinforced Ceramic Composites", J. Am. Ceram. Soc., 73 (1990) 388–393.
White et al., "Replamineform: A New Process for Preparing Porous Ceramic, Metal, and Polymer Prosthetic Mterials", Science, 176 (1972) 922–924.
Scholz et al., "Nitridation reactions of molten Al—(Mg,Si) alloys", Journal of Materials Science, 26 (1991) 669–677.
Frazier et al., "Microstructure and Properties of Extruded P/M Aluminum Polymer Blends", *Metal & Ceramic Matrix Composites: Processing, Modeling & Mechanical Behavior* (1990) 597–604.

Primary Examiner—William Powell
Attorney, Agent, or Firm—Florence Fusco McCann

[57] ABSTRACT

A method is provided for preparation of a composite including steps of providing a preform and a liquid infiltrant alloy including at least two elements and having a liquid infiltrant alloy composition which is selected so that the liquid infiltrant alloy spontaneously infiltrates the preform and contacting the liquid infiltrant alloy with the preform so that a chemical reaction occurs to form a composite by reactive infiltration, as are composites produced according to the method of the invention.

40 Claims, 3 Drawing Sheets

U.S. PATENT DOCUMENTS

| | | | |
|---|---|---|---|
| 5,017,334 | 5/1991 | Claar et al. | 419/12 |
| 5,020,584 | 6/1991 | Aghajanian et al. | 164/97 |
| 5,079,195 | 1/1992 | Chiang et al. | 501/92 |
| 5,102,601 | 4/1992 | Farris et al. | 264/183 |
| 5,104,029 | 4/1992 | Claar | 228/124 |
| 5,133,494 | 7/1992 | Wang et al. | 228/122 |
| 5,143,870 | 9/1992 | Claar et al. | 501/87 |
| 5,149,678 | 9/1992 | Claar et al. | 501/134 |
| 5,180,697 | 1/1993 | Claar et al. | 501/96 |
| 5,187,128 | 2/1993 | White et al. | 501/96 |
| 5,203,488 | 4/1993 | Wang et al. | 228/122 |

METHOD FOR PRODUCING AN ARTICLE BY PRESSURELESS REACTIVE INFILTRATION

The United States Government has rights in this invention based on Contract No. N0014-90-J-1999 from the Office of Naval Research.

BACKGROUND OF THE INVENTION

1. Field of the Invention

The invention relates to a method for producing an article by reactive infiltration and to an article so produced.

2. Description of the Prior Art

In processes of forming metal-based composite materials, also known as metal matrix composites, a preform composed of a solid reinforcement material is often infiltrated with a liquid metal, which after solidification forms a solid matrix surrounding the reinforcement material. A chemical reaction or reactions between the infiltrating liquid metal and the solid reinforcement are often detrimental and are usually avoided. Further, the liquid infiltrant often does not wet the preform and pressure must be applied in order to force the infiltrant into the porous preform. For example, the processing of aluminum-carbon and aluminum-silicon carbide composites typically requires the use of pressure infiltration techniques such as pressure-casting or squeeze-casting, since aluminum does not wet either carbon or silicon carbide. Pressure infiltration processing is costly and, furthermore, imposes constraints on the shape of the preform to be infiltrated and, thus, upon the shape of the finished article to be produced. For example, shapes including re-entrant surfaces are difficult to process using a pressure-infiltration technique where a mold is required.

In a reactive infiltration process, a compound is formed by infiltration of a porous, solid preform with a liquid which chemically reacts with the preform to form a desired compound. By contrast with metal matrix composite processing by infiltration, as previously described, in a reactive infiltration process, chemical reaction between preform and infiltrant is desired, and is, in fact, promoted. The preform material and infiltrating liquid must be chemically reactive, and are chosen based on the compound which is to be formed. In reactive infiltration, the liquid may not infiltrate the porous solid preform without applied pressure, rendering processing difficult. In a reactive infiltration process, it is thus desirable to have both a liquid which will infiltrate the solid preform without applied pressure as well as be chemically reactive with the preform to form the desired compound.

Pressureless infiltration techniques have been developed, such as that described in U.S. Pat. No. 4,904,446 to White et al., issued Feb. 27, 1990. According to the White et al. method, the characteristics of the boron nitride preform, including preform porosity, are controlled so that infiltrant metal is drawn or transported through the preform by wicking or capillary action.

Thus there exists a need for a near-net shape, relatively economical pressureless infiltration process wherein spontaneous preform infiltration is accomplished by controlling liquid infiltrant composition so that the liquid infiltrant wets the preform.

SUMMARY OF THE INVENTION

The invention provides a method for producing articles, including composites, in near-net shape form which obviates the need for pressurizing the liquid infiltrant and which accomplishes pressureless infiltration by controlling the composition of the liquid infiltrant through selective alloying so that the liquid infiltrant wets and spontaneously infiltrates and reacts with the preform to form an article.

Other and further objects, features and advantages of the present invention will be readily apparent to those skilled in the art upon reading the description of the preferred embodiments which follows.

DETAILED DESCRIPTION OF THE INVENTION

Figure 1:
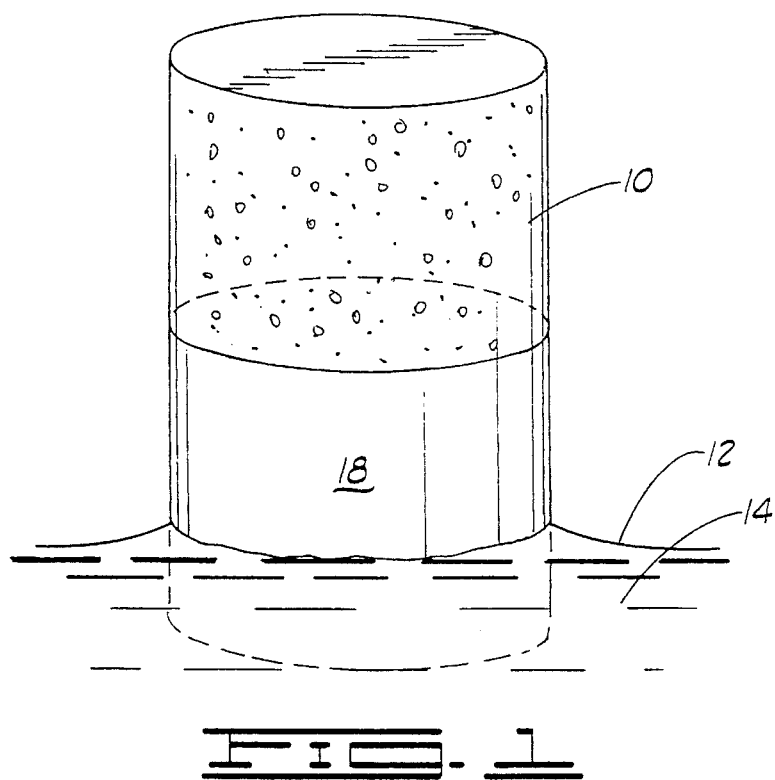
FIG. 1 is a schematic illustration of spontaneous infiltration of a preform by a liquid infiltrant.

The invention provides a method for preparation of a composite including steps of providing a preform; providing a liquid infiltrant alloy including at least two elements and having a liquid infiltrant alloy composition which is selected so that the liquid infiltrant alloy wets the preform and spontaneously infiltrates the preform; bringing the liquid infiltrant alloy and the preform into contact so that the preform is infiltrated and a chemical reaction occurs whereby the liquid infiltrant alloy reacts with the preform to form a reacted preform, and cooling the reacted preform to form a solid composite.

As used herein, the term "preform" refers to a porous, solid body which can be made up of a powder of an element, a mixture of powders of elements or be an integral porous body having sufficient strength to maintain dimensional integrity during infiltration. The terms "wets", "wet" or "wetting" are used to mean that the contact angle between the liquid infiltrant alloy and the preform is such that the liquid infiltrant alloy spreads over the preform readily. A contact angle of less than 90° results in spontaneous infiltration. By contrast, "nonwetting" means that the contact angle between the liquid infiltrant alloy and the preform is greater than 90° so that the liquid infiltrant alloy tends, instead, to ball up and run off the surface of the preform easily. In order for the liquid infiltrant alloy to be readily transported throughout the bulk of the preform and react chemically with the preform, the liquid infiltrant alloy needs to wet the preform. The terms "spontaneous infiltration" and "spontaneously infiltrates" are used herein to indicate that the liquid infiltrant alloy is transported through the bulk of the preform without the need for application of pressure to the liquid infiltrant alloy or creation of a vacuum. The term "composite" as used herein refers both to an article which contains at least two phases or an article which contains a 0single phase, the compound formed by reaction of the liquid infiltrant alloy with the preform.

The preform can be an integral preform body characterized by a three-dimensionally interconnected pore structure. The three-dimensionally interconnected pore structure can include a pore structure characterized by a pore size in the range of from about 0.1 µm to about 500 µ, more preferably in the range of from about 0.5 µm to about 20 µ and most preferably in the range of from about 0.5 µ to about 10 µ. The preform can consist essentially of carbon or can consist essentially of carbon combined with at least one other material such as a metal like Mo, W, or Nb; a carbide like SiC, TiC, or ZrC; a nitride like $Si_3N_4$, TiN or AlN; an oxide like $ZrO_2$, or $Al_2O_3$; or an intermetallic compound like $MoSi_2$, or $WSi_2$ or mixtures thereof. The carbon preform can be glassy carbon or graphite. The preform can be characterized by a bulk preform density in the range of from about 0.20 g/cc to about 0.96 g/cc and more preferably in the range of from about 0.40 g/cc to about 0.90 g/cc and depending upon that preform density, the liquid infiltrant alloy composition can be selected so that the resulting composite has a desired phase assemblage. As used herein, the term "phase assemblage" refers to the presence of at least two distinct phases wherein a distinct phase is distinguished as such on the basis of its particular characteristics which include properties such as chemical composition, crystal structure and density The liquid infiltrant alloy can be a silicon alloy which includes silicon and a metal such as aluminum, copper, zinc, nickel, cobalt, iron, manganese, chromium, titanium, silver, gold, platinum and mixtures thereof. The liquid infiltrant alloy is maintained at a liquid infiltrant alloy temperature which is selected so that all phases in the liquid infiltrant alloy are liquid phases and so that no solid phases are present.

The liquid infiltrant alloy is contacted with the preform so that complete capillary infiltration of the preform occurs. As used herein, "capillary infiltration" refers to transport of the liquid infiltrant alloy through the pores of the preform in a manner analogous to the way in which a liquid which wets the walls of a capillary rises in a capillary without any need for application of additional pressure to the system.

The liquid infiltrant alloy can be contacted with the preform by dipping or immersing the preform in the liquid infiltrant alloy or the liquid infiltrant alloy can be poured onto the preform. Dipping, immersing or pouring can be performed in a vacuum or in an inert atmosphere.

FIG. 1 shows preform 10 being contacted with liquid infiltrant alloy 14 by dipping preform 10 beneath surface 12 of liquid infiltrant alloy 14 so that liquid infiltrant alloy 14 spontaneously infiltrates preform 10 and reacts with the preform to produce reacted preform 18.

The liquid infiltrant alloy and the preform can be kept in contact until the chemical reaction between the preform and the liquid infiltrant alloy has gone to completion or until a desired phase assemblage is produced in the reacted preform and subsequently in the composite. The chemical reaction can be allowed to proceed until a ceramic primary phase and at least one secondary phase are formed in the composite. The term "primary phase" as used herein refers to a phase formed by reaction of the preform with a component of the melt. The term "secondary phase" refers to the phase or phases which are formed when the composition of the liquid infiltrant is altered by the formation of the primary phase. The ceramic primary phase can be silicon carbide and the secondary phase can be a metal-rich phase such as a substantially pure metal like aluminum, copper, nickel or silver; a silicon-containing metal alloy including one or more of the metals already set forth; a silicon-metal compound including any of the metals already described and mixtures thereof. A "substantially pure" metal is a relatively pure, commercially available unalloyed metal. The primary ceramic phase can be silicon carbide and the secondary phase can be an alloy having a composition substantially the same as that of the liquid infiltrant alloy.

The chemical reaction between the preform and the liquid infiltrant alloy can also be controlled so that a substantially metal-rich primary phase and a ceramic secondary phase are formed in the composite.

After the preform has been contacted with the liquid infiltrant alloy for a time sufficient to infiltrate and react with the preform to produce a reacted preform, unreacted liquid infiltrant alloy, which can be in liquid or solid form, which remains on a reacted preform surface can be removed by heating the reacted preform to a temperature sufficient to maintain the unreacted infiltrant alloy as a liquid. For example, for a silicon-containing alloy, the vapor pressure of silicon is high over the liquid alloy, so that if one heats the reacted preform to a temperature at which the alloy is molten, it is possible to evaporate residual surface liquid. The evaporation can be performed in a selected atmosphere such as a vacuum or inert gas.

Unreacted liquid infiltrant alloy can also be removed from the reacted preform surface by contacting the reacted preform with a powder which is chemically reactive with the unreacted liquid infiltrant alloy such as carbon, or a metal, like Ti, Zr, Mo or W powders or mixtures thereof.

Yet another way to remove unreacted liquid infiltrant alloy from the reacted preform surface is to immerse the reacted preform in an etchant in which the reacted preform is substantially insoluble and in which the unreacted liquid infiltrant alloy is substantially soluble. As will be apparent to one skilled in the art, the dissolving properties of the etchant are selected so that the excess unreacted liquid infiltrant is dissolved away while the reacted preform is left intact.

In a preferred embodiment of the invention, the preform can be a porous carbon preform, the liquid infiltrant alloy can be a silicon-aluminum alloy containing in the range of from about 90 at % to about 40 at % silicon and in the range of from about 10 at % to about 60 at % aluminum and the carbon preform can be contacted with the silicon-aluminum alloy at a temperature in the range of from about 900° C. to 1800° C. for a time sufficient so that at least some of the porous carbon preform is reacted to form silicon carbide, and the reacted preform cooled so that a dense composite is formed. The dense composite can be characterized by a phase assemblage as defined previously and the phase assemblage can include silicon carbide and at least one phase such as a silicon-aluminum alloy, a mixture of aluminum and silicon, substantially pure aluminum or mixtures thereof.

According to another preferred embodiment of the invention, the preform can be a porous carbon preform, the liquid infiltrant alloy can be a silicon-copper alloy containing in the range of from about 90 at % to about 40 at % silicon and in the range of from about 10 at % to about 60 at % copper and the carbon preform can be contacted with the silicon-copper alloy at a temperature in the range of from about 900° C. to 1800° C. for a time sufficient so that at least some of the porous carbon preform is reacted to form silicon carbide, and the reacted preform cooled so that a dense composite is formed. The dense composite can be characterized by a phase assemblage as defined previously and the phase assemblage can include silicon carbide and at least one phase selected from the group consisting of a silicon-copper alloy, a mixture of silicon and a copper-rich compound, a copper-rich compound, substantially pure copper and mixtures thereof.

The invention also provides a composite produced according to the already-described method. Such composites can have linear dimensions within 2 % of the preform linear dimensions, so that the method allows production of composites very near net-shape without a need for additional machining steps. Composites produced according to the method of the invention can be characterized by a substantially fully dense microstructure which as used herein refers to a microstructure having a silicon carbide primary phase which is interconnected, and a metal-rich secondary phase which may be either interconnected or discrete, a silicon carbide volume fraction in the range of from about 20 % to about 90 %, a residual metal phase selected from the group consisting of a silicon-aluminum alloy, substantially pure silicon, silicon-containing aluminum, substantially pure aluminum and mixtures thereof. A composite produced according to the method of the invention can also include at least one phase such as carbon; a metal like Mo, or W; an oxide like $Al_2O_3$, $ZrO_2$, or MgO; a nitride like $Si_3N_4$; an intermetallic compound like $MoSi_2$ or $WSi_2$ or mixtures thereof.

A composite produced according to the method of the invention can also be characterized by a substantially fully dense microstructure, a silicon carbide volume fraction in the range of from about 20% to about 90 %, a residual metal phase such as substantially pure copper, a copper-silicon alloy, or copper-silicon compounds such as the $\eta, \epsilon, \gamma,$ and $\kappa$ phases which are well known to one skilled in the art and identified on the basis of their chemical composition and crystal structure. The composite can also include at least one phase such as carbon; a metal like Mo or W; an oxide like $Al_2O_3$, $ZrO_2$, or MgO; a nitride like $Si_3N_4$; an intermetallic compound like $MoSi_2$ or $WSi_2$ or mixtures thereof.

A composite prepared according to the method of the invention can have a continuously interconnected metal-rich phase or a discrete metal phase.

A composite prepared according to the method of the invention can be used as electronic packaging where highly thermally conductive supports for silicon and gallium arsenide-based circuits are required. Both Sic—Al alloy and Sic—Cu alloy materials are suitable for electronic packaging applications since they have appropriate thermal conductivity and are thermal expansion matched to the circuit chips. Sic—Al alloy composites made according to the method of the invention have a higher fraction of SiC than that of conventional Sic—Al materials.

Composites prepared according to the method of the invention can also be used for wear parts of internal combustion engines, including, for example, valves and cam roller followers.

In order to further illustrate the method of the present invention and the characteristics of articles produced according to that method, the following examples are provided. The particular compounds and processing conditions utilized in the examples are meant to be illustrative of the present invention and not limiting thereto.

EXAMPLE 1

The following example is provided to show how a preform, specifically, a carbon preform, can be spontaneously infiltrated by controlling the composition of the liquid infiltrant alloy and, specifically, by contacting the carbon preform with a silicon-aluminum alloy which wets the carbon preform.

Figure 3:
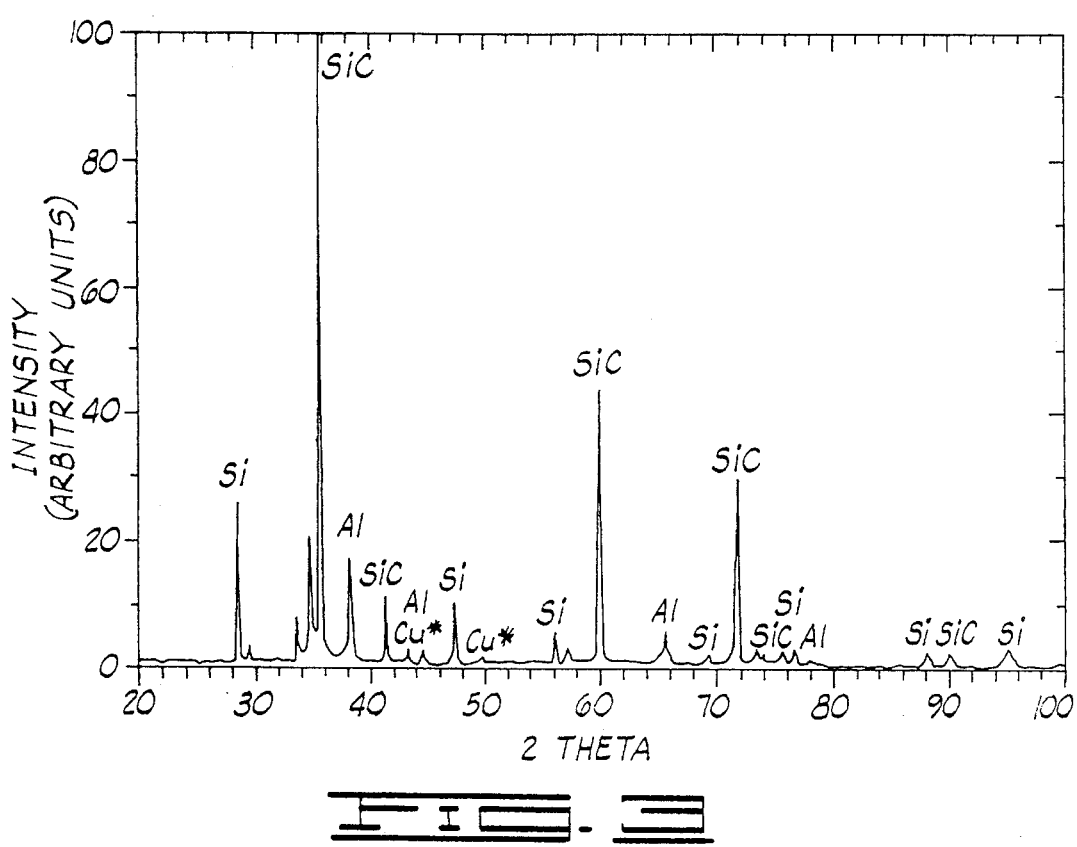
FIG. 3 is an x-ray diffraction scan obtained for the composite shown in the SEM micrograph of FIG. 2.
Figure 2:
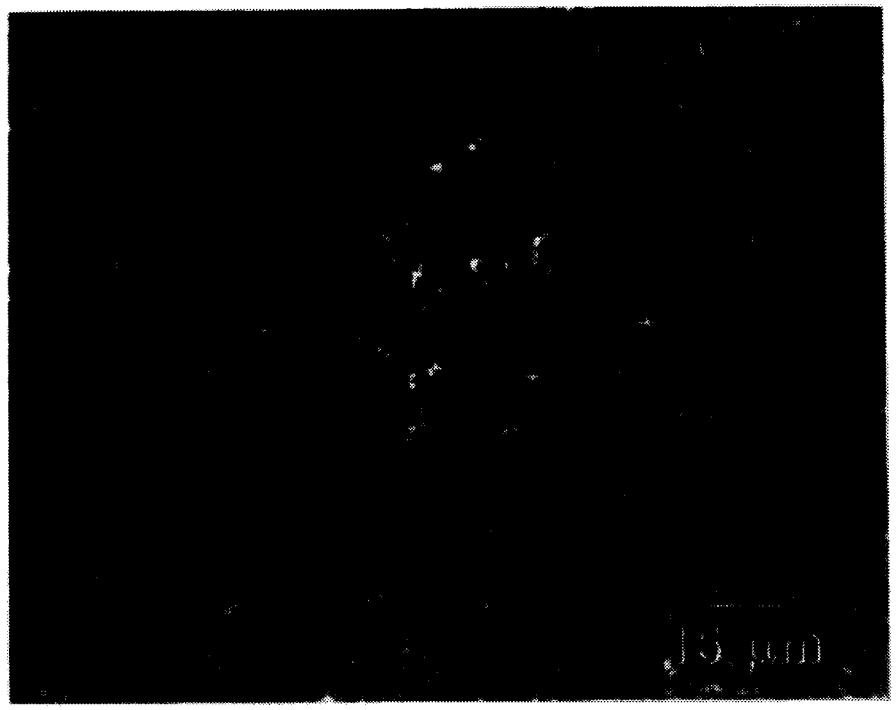
FIG. 2 is an SEM micrograph of a Sic—Al alloy (Sic—Al/Si) composite prepared according to the method of the invention.

A 1 cm in diameter porous carbon preform having a density of 0.80 g/cc and average pore size of 1 μm, was contacted with and spontaneously infiltrated with an alloy having a composition of 85 at % Si and 15 at % Al at a temperature of 1425° C. by dipping the preform into the silicon-aluminum alloy in a vacuum. The initial temperature of 1425° C. rose during the spontaneous infiltration process which indicates that reactive infiltration occurred as the silicon-aluminum alloy reacted with the carbon preform according to the exothermic reaction of Si and C to form SiC. The preform was left in the liquid infiltrant alloy for 15 minutes after dipping. After cooling to form the finished composite, the composite was sliced and polished and observed by visual examination, optical microscopy, scanning electron microscopy (SEM), x-ray diffraction, and electron microprobe analysis. These observations demonstrated that the silicon-aluminum alloy had fully penetrated the 1 cm diameter preform and reacted therewith to produce a substantially pore-free composite having a density of 3.0 $g/cm^3$. The composite was analyzed by x-ray diffraction, the results of which are shown in the scan of FIG. 3. Based on calibration of the system with standards of known SiC/Si content, the volume fraction of SiC was determined to 75 volume %.

The composition of the silicon-aluminum liquid infiltrant alloy must be carefully selected to avoid formation of $Al_4C_3$, a compound which reacts readily with water and whose presence, therefore, is considered to be highly undesirable in a composite. In the above-described experiment, the formation of $Al_4C_3$ was avoided in two ways. First, the aluminum was alloyed with silicon which is a stronger carbide former than is aluminum. Thus, by using a liquid infiltrant alloy having a high silicon content, SiC formation can be made to dominate, thereby consuming available carbon from the preform and avoiding formation of $Al_4C_3$. Furthermore, the reaction of the silicon-aluminum alloy is allowed to proceed essentially to completion and the overall composition of the finished composite is chosen to be in the SiC-aluminum alloy or SiC-aluminum alloy-silicon compatibility fields of the ternary Si—C—Al phase diagram. The choice of an overall composite composition in the SiC-aluminum alloy two phase field will result, at equilibrium, in a SiC-aluminum alloy composite in which the relative proportions and compositions of the two phases present can be predicted based on the intersection of the tie lines between SiC and Al—Si. The Al—Si alloy which exists at equilibrium at high temperature solidifies upon cooling to form aluminum with some finely divided silicon dispersed therein. Three phase composites can be prepared according to analogous considerations, but, instead, an overall finished composite composition in the SiC—Al—Si three phase field is chosen.

Table 1 lists the results of experiments performed as described in the foregoing example and provides data for the SIC content of the final composite, Young's modulus, and Vicker's hardness as measured for composites prepared from preforms and liquid infiltrant alloys having the given densities and compositions, respectively.

TABLE 1

| Sample No. | Preform Density (g/cm³) | Infiltrant Alloy Composition (at %) | SiC Content (volume %) | Young's Modulus (GPa) | Vicker's Hardness (GPa) |
|---|---|---|---|---|---|
| 1 | 0.8 | 13.0% Al 87.0% Si | 76.9 | 327.6 | 17.84 (± 1.05) |
| 2 | 0.8 | 17.3% Al 82.7% Si | 73.7 | 319.3 | 17.71 (± 0.97) |
| 3 | 0.8 | 19.0% Al 81.0% Si | 72.7 | 341.1 | 14.78 (± 1.91) |
| 4 | 0.65 | 24.9% Al 75.1% Si | 58.0 | 299 | 10.85 (± 1.16) |

EXAMPLE 2

This example is provided to show how a preform, specifically, a carbon preform, can be spontaneously infiltrated by controlling the composition of the liquid infiltrant alloy and, specifically, by contacting the carbon preform with a silicon-copper alloy which wets the carbon preform. Comparative data is also provided to demonstrate how the ability to spontaneously infiltrate the composite depends upon the copper content of the liquid infiltrant alloy.

Figure 4:
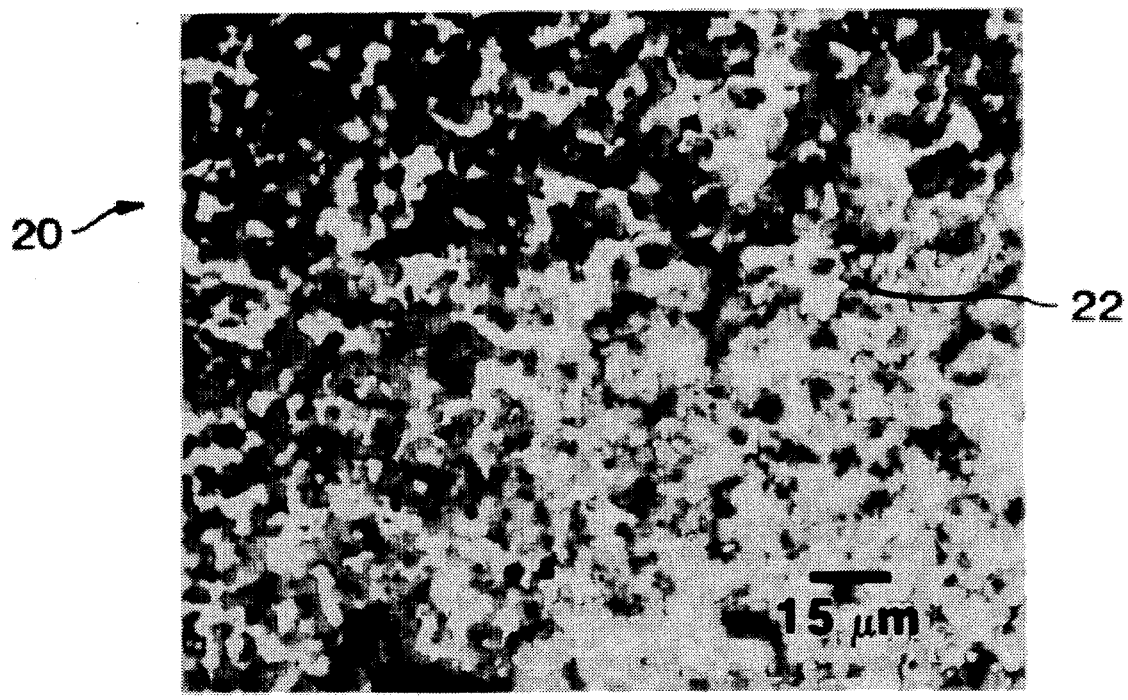
FIG. 4 is an SEM micrograph of a Sic—Cu alloy (Sic—Cu/Si) composite prepared according to the method of the invention.

1 cm in diameter microporous carbon preforms having macroscopic densities of 0.65 g/cc and 0.80 g/cc, respectively, and pore size of approximately 3 µm and 1 µm, respectively, as measured by mercury intrusion porosimetry, were contacted with and spontaneously infiltrated with an alloy having a composition of 54 at % Si and 46 at % Cu at temperatures of 1300° C. and 1450° C., respectively, by dipping the preform into the silicon-copper alloy in a vacuum. After cooling to form the finished composites, the composites were sliced and polished and observed by visual examination, optical microscopy, scanning electron microscopy (SEM), x-ray diffraction and electron microprobe analyses. These observations indicated that the silicon-copper alloy had fully penetrated the preform and reacted therewith to produce a dense composite. Further optical microscopic examination of the polished surfaces indicated that the composites were fully dense, with no observable porosity and contained a large fraction of silicon carbide, with Si—Cu compound and Cu metal phases as shown in the scanning electron microscope (SEM) micrographs of FIG. 4 obtained for a SiC—Cu/Si composite 20 prepared from a carbon preform having a density of 0.65 g/cc. Dark areas 22 are a SiC phase. The 0.65 g/cc preform should produce a composite having 67 volume % SiC and the 0.80 g/cc preform should produce a composite having 83 volume % SiC.

The presence of residual metal phases in the composite was expected to provide substantially improved fracture toughness by comparison with a pure carbide material. Room temperature 3-point flexural strengths of 360 MPa have been measured for 20 mm×2 mm×3 mm samples.

Table 2 lists the results of experiments performed as described in the foregoing example and provides data for the SiC content of the final composite, and Vicker's hardness as measured for composites prepared from preforms and liquid infiltrant alloys having the given densities and compositions, respectively,

TABLE 2

| Sample No. | Preform Density (g/cm³) | Infiltrant Alloy Composition (at %) | SiC Content (volume %) | Vicker's Hardness (GPa) |
|---|---|---|---|---|
| 1 | 0.65 | 33.0% Cu 67.0% Si | 54.3 | 12.6 (± 1.8) |
| 2 | 0.65 | 38.5% Cu 61.5% Si | 59 | 13.9 (± 1.2) |

Figure 5:
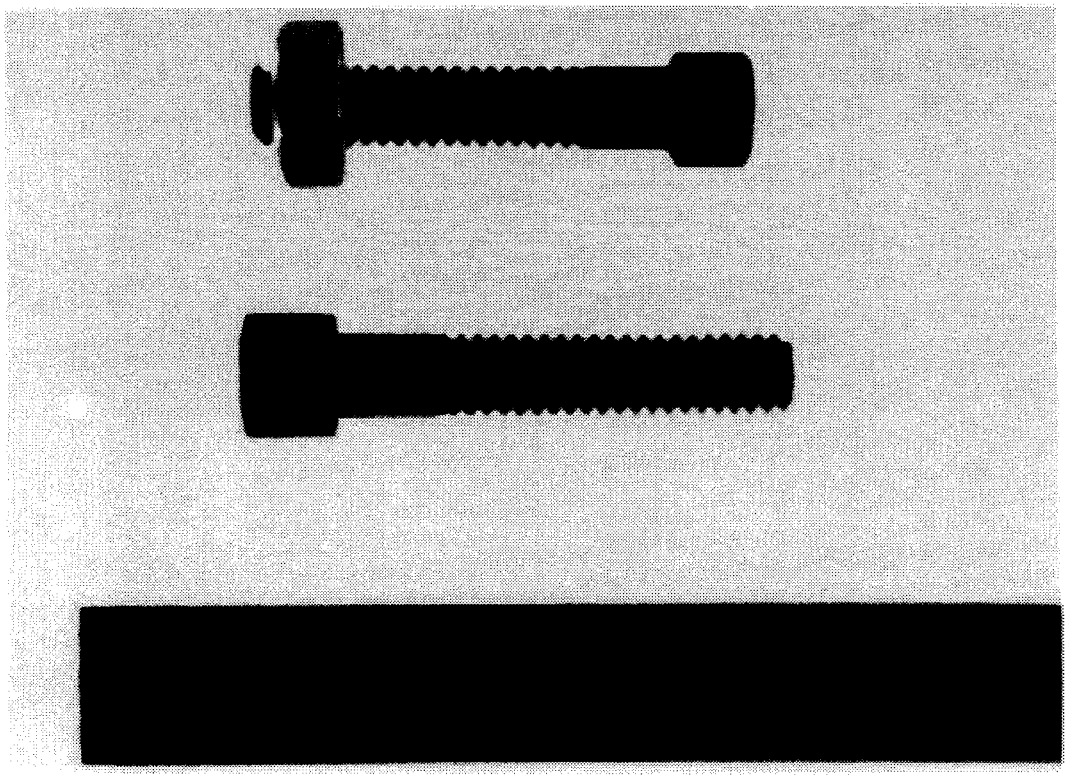
FIG. 5 is a photograph showing a composite component produced according to the method of the invention.

In order to demonstrate the capability of the method of the invention to provide near-net shape and near-net dimension processing, a 0.80 g/cc density carbon preform was fabricated using conventional machining and die-cutting operations to replicate the shape of a ¼', 20 thread-per-inch hex head bolt. After reactive infiltration, has already described, with a silicon-copper alloy infiltrant, the composite bolt produced showed extremely good retention of surface features machined in the preform and linear dimensional retention within 0.05%. The composite hex head bolt components processed according to the method of the invention are shown in FIG. 5

Comparative studies using a pure copper liquid infiltrant and a eutectic Cu-Si alloy of 70 at % Cu and 30 at % Si did not spontaneously infiltrate a porous carbon preform at temperatures in the range of from about 1085° C. to 1150° C. as summarized in Table 3.

TABLE 3

| Infiltrant Alloy Composition | Preform Density | Temperature | Result |
|---|---|---|---|
| Pure Cu | 0.65 g/cm³ carbon | >1085° C. | No spontaneous infiltration; applied pressure required for infiltration. |
| 70 at % Cu, 30 at % Si (Eutectic Alloy Composition) | 0.65 g/cm³ carbon | 1150° C. ($T_{eut}$ at 802° C.) | No spontaneous infiltration; applied pressure required for infiltration. |
| 46 at % Cu, 54 at % Si | 0.65 g/cm³ carbon | 1300° C. ($T_{liq}$ at | Wetting and complete infiltration to produce a |

TABLE 3-continued

| Infiltrant Alloy Composition | Preform Density | Temperature | Result |
|---|---|---|---|
| | | 1100° C.) | composite nominally 67 volume % SiC, 33 volume % Cu. |
| 46 at % Cu, 54 at % Si | 0.80 g/cm³ carbon | 1450° C. ($T_{liq}$ at 1100° C.) | Wetting and complete fiffiration to produce a composite nominally 83 volume % SiC, 17 volume % Cu and Cu—Si. . |

What is claimed is:

1. A method for preparation of a composite comprising:
   (1) providing a porous preform;
   (2) providing a liquid infiltrant alloy including at least two elements and further characterized by a liquid infiltrant alloy composition selected so that said liquid infiltrant alloy wets said preform and so that said liquid infiltrant alloy spontaneously infiltrates said preform;
   (3) contacting said liquid infiltrant alloy with said preform so that a chemical reaction occurs whereby said liquid infiltrant alloy reacts with said preform to form a reacted preform; and
   (4) cooling said reacted preform to form a solid composite.

2. The method of claim 1 wherein said preform is further characterized by a three-dimensionally interconnected pore structure.

3. The method of claim 2 wherein said three-dimensionally interconnected pore structure further includes pores which are characterized by a pore size and wherein said pore size is in the range of from about 0.1 μm to about 500 μm, more preferably in the range of from about 0.5 μm to about 20 μm and most preferably in the range of from about 0.5 μm to about 10 μm.

4. The method of claim 1 wherein said preform consists essentially of carbon.

5. The method of claim 1 wherein said preform consists essentially of carbon and at least one other material selected from the group consisting of a metal, a carbide, a nitride, an oxide, an intermetallic compound and mixtures thereof.

6. The method of claim 4 wherein said carbon is selected from the group consisting of glassy carbon and graphite and said preform is characterized by a preform bulk density in the range of from about 0.20 g/cc to about 0.96 g/cc and more preferably in the range of from about 0.40 g/cc to about 0.90 g/cc.

7. The method of claim 1 wherein said preform is further characterized by a preform density, and said composite is further characterized by a composite phase assemblage and further including a step of selecting said liquid infiltrant alloy composition so that a desired phase assemblage is obtained.

8. The method of claim 1 wherein said liquid infiltrant alloy includes silicon and a metal selected from the group consisting of aluminum, copper, zinc, nickel, cobalt, iron, manganese, chromium, titanium, silver, gold, platinum and mixtures thereof.

9. The method of claim 8 wherein said liquid infiltrant alloy is further characterized by a liquid infiltrant alloy temperature and further including a step of selecting said liquid infiltrant alloy temperature so that all phases in said liquid infiltrant alloy are liquid phases.

10. The method of claim 1 wherein said step of contacting said liquid infiltrant alloy with said preform is performed so that complete capillary infiltration of said preform occurs.

11. The method of claim 10 wherein said step of contacting said liquid infiltrant alloy with said preform further includes a step of dipping said preform into said liquid infiltrant alloy.

12. The method of claim 10 wherein said step of contacting said liquid infiltrant alloy with said preform further includes a step of immersing said preform in said liquid infiltrant alloy.

13. The method of claim 10 wherein said step of contacting said liquid infiltrant alloy with said preform further includes pouring said liquid infiltrant alloy onto said preform.

14. The method of claim 1 wherein said step of contacting said liquid infiltrant alloy with said preform further includes allowing said chemical reaction to proceed to completion.

15. The method of claim 1 wherein said step of contacting said liquid infiltrant alloy with said preform further includes allowing said chemical reaction to proceed so that a ceramic primary phase and at least one secondary phase are formed in said composite.

16. The method of claim 15 wherein said primary ceramic phase is silicon carbide and said secondary phase is a substantially metal-rich phase selected from the group consisting of a substantially pure metal, a silicon-containing metal alloy, a silicon-metal compound and mixtures thereof.

17. The method of claim 15 wherein said primary ceramic phase is silicon carbide and said secondary phase is further characterized by an alloy composition and said alloy composition is substantially the same as said liquid infiltrant alloy composition.

18. The method of claim 1 wherein said step of contacting said liquid infiltrant alloy with said preform further includes allowing said chemical reaction to proceed so that a substantially metal-rich primary phase and a ceramic secondary phase are formed in said composite.

19. The method of claim 15 wherein said reacted preform is further characterized by a reacted preform surface and wherein unreacted liquid infiltrant alloy contacts said reacted preform surface and further including a step of removing said unreacted liquid infiltrant alloy which is in contact with said reacted preform surface by heating said preform so that said unreacted liquid infiltrant alloy is liquid in a selected atmosphere at a temperature sufficient to maintain said unreacted liquid infiltrant alloy as a liquid.

20. The method of claim 15 wherein said reacted preform is further characterized by a reacted preform surface and wherein unreacted liquid infiltrant alloy contacts said reacted preform surface and further including a step of removing said unreacted liquid infiltrant alloy which is in contact with said reacted preform surface by contacting said reacted preform surface with a powder which is chemically reactive with said unreacted liquid infiltrant alloy.

21. The method of claim 20 wherein said powder is selected from the group consisting of carbon, and metal powders and mixtures thereof.

22. The method of claim 15 wherein said reacted preform is further characterized by a reacted preform surface and wherein unreacted liquid infiltrant alloy contacts said reacted preform surface and further including a step of removing said unreacted liquid infiltrant alloy which is in contact with said reacted preform surface by immersing said reacted preform in an etchant in which said reacted preform is substantially insoluble and in which said unreacted liquid infiltrant alloy is substantially soluble.

23. A composite prepared according to the method of claim 1.

24. A composite prepared according to the method of claim 1 wherein said preform is further characterized by a linear preform dimension and said composite is further characterized by a composite linear dimension and said preform linear dimension differs from said composite linear dimension by no more than 2%.

25. A package for an integrated circuit comprising a composite characterized by a substantially fully dense microstructure, a silicon carbide volume fraction in the range of from about 20% to about 90%, and a residual metal phase selected from the group consisting of a silicon-aluminum alloy, substantially pure silicon, silicon-containing aluminum, substantially pure aluminum and mixtures thereof.

26. A wear part for an internal combustion engine comprising a composite characterized by a substantially fully dense microstructure, a silicon carbide volume fraction in the range of from about 20% to about 90%, and a residual metal phase selected from the group consisting of a silicon-aluminum alloy, substantially pure silicon, silicon-containing aluminum, substantially pure aluminum and mixtures thereof.

27. The method of claim 1 wherein said preform is a porous carbon preform, said liquid infiltrant alloy is a silicon-aluminum alloy containing in the range of from about 90 at % to about 40 at % silicon and in the range of from about 10 at % to about 60 at % aluminum, said step of contacting said porous carbon preform with said silicon-aluminum alloy further includes contacting said porous carbon preform with said silicon-aluminum alloy so that said silicon-aluminum alloy fully penetrates said porous carbon preform, reacting said porous carbon preform with said silicon-aluminum alloy at a temperature in the range of from about 900° C. to about 1800° C. for a time sufficient so that at least some of said porous carbon preform is reacted to form silicon carbide, and cooling said reacted preform so that a dense composite is formed.

28. The method of claim 27 wherein said dense composite is further characterized by a phase assemblage and said phase assemblage includes at least one phase selected from the group consisting of silicon carbide, a silicon-aluminum alloy, a mixture of aluminum and silicon, substantially pure aluminum and mixtures thereof.

29. The method of claim 1 wherein said preform is a porous carbon preform, said liquid infiltrant alloy is a silicon-copper alloy containing in the range of from about 90 at % to about 40 at % silicon and in the range of from about 10 at % to about 60 at % copper, said step of contacting said porous carbon preform with said silicon-copper alloy further includes contacting said porous carbon preform with said silicon-copper alloy so that said silicon-copper alloy fully penetrates said porous carbon preform, reacting said porous carbon preform with said silicon-copper alloy at a temperature in the range of from about 900° C. to about 1800° C. for a time sufficient so that at least some of said porous carbon preform is reacted to form silicon carbide, and cooling said reacted preform so that a dense composite is formed.

30. The method of claim 29 wherein said dense composite is further characterized by a phase assemblage and said phase assemblage consists of silicon carbide and at least one phase selected from the group consisting of a silicon-copper alloy, a mixture of silicon and a copper-rich compound, a copper-rich compound, substantially pure copper and mixtures thereof.

31. A composite prepared according to the method of claim 27.

32. A composite characterized by a substantially fully dense microstructure, a silicon carbide volume fraction in the range of from about 20% to about 90%, a residual metal phase selected from the group consisting of a silicon-aluminum alloy, substantially pure silicon, silicon-containing aluminum, substantially pure aluminum and mixtures thereof.

33. The composite of claim 32 further comprising at least one phase selected from the group consisting of carbon, a metal, an oxide, a nitride, an intermetallic compound and mixtures thereof.

34. A composite prepared according to the method of claim 29.

35. A composite characterized by a substantially fully dense microstructure, a silicon carbide volume fraction in the range of from about 20% to about 90%, a residual metal phase selected from the group consisting of substantially pure copper, copper-silicon compounds and $\eta,\epsilon,\gamma$, and $\kappa$ phases and mixtures thereof.

36. The composite of claim 35 further comprising at least one phase selected from the group consisting of carbon, a metal, an oxide, a nitride, an intermetallic compound and mixtures thereof.

37. A composite prepared according to the method of claim 1 characterized by a continuously interconnected metal-rich phase.

38. A composite prepared according to the method of claim 1 characterized by a discrete metal-rich phase.

39. A package for an integrated circuit comprising a composite characterized by a substantially fully dense microstructure, a silicon carbide volume fraction in the range of from about 20% to about 90%, and a residual metal phase selected from the group consisting of substantially pure copper, copper-silicon compounds and $\eta,\epsilon,\gamma$, and $\kappa$ phases and mixtures thereof.

40. A wear part for an internal combustion engine comprising a composite characterized by a substantially fully dense microstructure, a silicon carbide volume fraction in the range of from about 20% to about 90%, and a residual metal phase selected from the group consisting of substantially pure copper, copper-silicon compounds and $\eta,\epsilon,\gamma$, and $\kappa$ phases and mixtures thereof.

* * * * *

UNITED STATES PATENT AND TRADEMARK OFFICE
CERTIFICATE OF CORRECTION

PATENT NO. : 5,509,555
DATED : April 23, 1996
INVENTOR(S) : Yet-Ming Chiang et al.

It is certified that error appears in the above-identified patent and that said Letters Patent is hereby corrected as shown below:

Title page, item [75], inventors; change ."ong" to --Jong--.
Column 2, line 16: after "a", change "Sic-Al" to --SiC-Al--.
Column 2, line 16: after "alloy (", change "Sic" to --SiC--.
Column 2, line 21: after "a", change "Sic-Cu" to --SiC-Cu--.
Column 2, line 21: after "alloy (", change "Sic" to --SiC--.
Column 2, line 66: at the beginning of the line, delete "0".
Column 3, line 5: after "µ" second occurrence, insert --m--.
Column 3, line 6: after "µ" second occurrence, insert --m--.
Column 3, line 7: after "µ" first occurrence, insert --m--.
Column 3, line 7: after "µ" second occurrence, insert --m--.
Column 5, after line 36: insert -- A composite produced according to the method of the invention can also be characterized by a substantially fully dense microstructure, a silicon carbide volume fraction in the range of from about 20% to about 90%, a residual metal phase such as substantially pure copper, a copper-silicon alloy, or copper-silicon compounds such as the $\eta, \varepsilon, \gamma,$ and $\kappa$ phases which are well known to one skilled in the art and identified on the basis of their chemical composition and crystal structure. The composite can also include at least one phase such as carbon; a metal like Mo or W; an oxide like $Al_2O_3$, $ZrO_2$, or MgO; a nitride like $Si_3N_4$; an intermetallic compound like $MoSi_2$ or $WSi_2$ or mixtures thereof.--

UNITED STATES PATENT AND TRADEMARK OFFICE
CERTIFICATE OF CORRECTION

PATENT NO. : 5,509,555
DATED : April 23, 1996
INVENTOR(S) : Yet-Ming Chiang et al.

It is certified that error appears in the above-identified patent and that said Letters Patent is hereby corrected as shown below:

Column 5, line 44: after "Both", change "Sic-Al" to --SiC-Al--.
Column 5, line 45: at the beginning of the line, change "Sic-Cu" to --SiC-Cu--.
Column 5, line 48: after "chips.", change "Sic-Al" to --SiC-Al--.
Column 5, line 50: after "conventional", change "Sic-Al" to --SiC-Al--.
Column 6, line 64: at the beginning of the line, change "SIC" to --SiC--.
Column 7, line 46: after "a", change "Sic-Cu/Si" to --SiC-Cu/Si--.
Column 12, claim 36, line 37: after "at", change "1east" to --least--.
Column 8, line 41: after "1/4", change "'" to --"--.

Signed and Sealed this

Twentieth Day of August, 1996

Attest:

BRUCE LEHMAN

*Attesting Officer*    *Commissioner of Patents and Trademarks*